United States Patent Office 3,268,497
Patented August 23, 1966

3,268,497
INTERPOLYMERS OF HEXACHLOROBICYCLO-HEPTENEALKYL ESTERS OF ARYLPHOSPHON-IC ACIDS
Robert J. Rolih, Joliet, Ill., and Emil F. Jason, Jefferson City, Mo., assignors to Standard Oil Company, Chicago, Ill., a corporation of Indiana
No Drawing. Original application Aug. 23, 1962, Ser. No. 218,839, now Patent No. 3,142,695. Divided and this application Nov. 21, 1963, Ser. No. 325,447
7 Claims. (Cl. 260—88.1)

This application is a division of co-pending application Serial No. 218,839, filed August 23, 1962, and now Patent No. 3,142,695.

This invention relates to halogen-containing organo-phosphorus compounds. More particularly, it relates to a novel class of arylphosphonates containing the hexa-chloronorbornene nucleus and to compositions containing such arylphosphonates.

The novel arylphosphonates of this invention are adducts of hexachlorocyclopentadiene and dialkenyl arylphosphonates. The structural formulae of these new compounds are represented by Formula I (I)
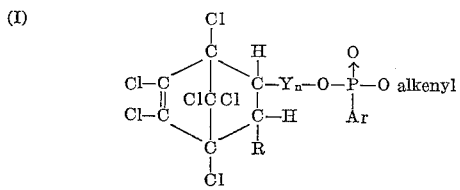

and Formula II (II)
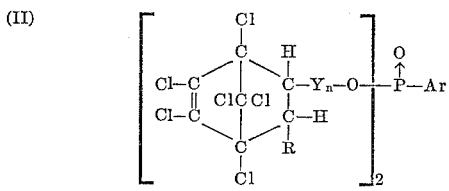

wherein Ar is an aromatic radical, R is from the group consisting of hydrogen and alkyl, Y is a divalent alkylene radical, and $n$ is an integer including zero.

The arylphosphonates containing the hexachloronor-bornene nucleus represented by Formula I are the adducts obtained by intermittently mixing substantially equimolar quantities of the hexachlorocyclopentadiene and dialkenyl arylphosphonate reactants. The adducts of Formula II are the reaction products of two moles of hexachlorocy-clopentadiene and one mole of the dialkenyl arylphosphonate.

Dialkenyl arylphosphonates broadly represented by the formula

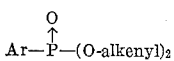

are more specifically represented herein by the formula

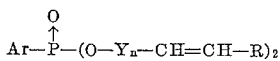

wherein Ar is an aromatic radical, R is from the group consisting of hydrogen and alkyl, Y is a divalent alkylene radical, and $n$ is an integer including zero, or one.

Hence, the adducts of Formulas I and II can be considered to be formed in accordance with the following schematic equations A and B, respectively.

(A)
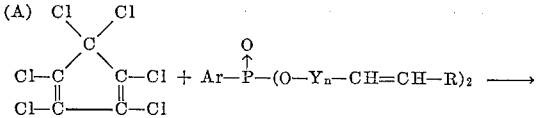

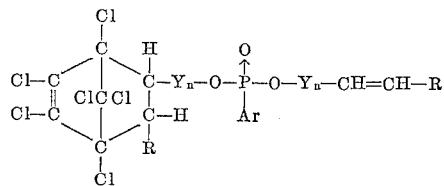

(B)
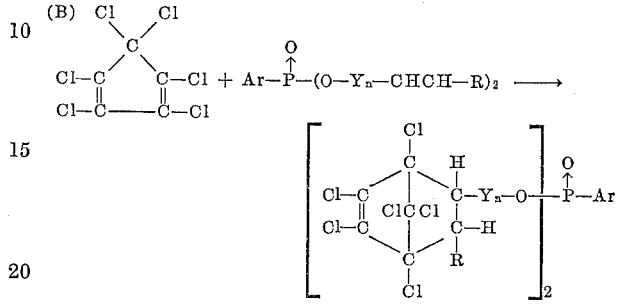

In the above formulae, Ar represents an aromatic radical such as phenyl, naphthyl, phenanthryl, and anthryl, which radical can be unsubstituted or substituted with substituents which are unreactive with the hexachloro-cyclopentadiene reactant, such as alkyl, aryl, chloro, bromo and nitro groups.

The alkenyl radical represented by

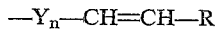

can be straight or branched-chain, containing 2 or more, preferably 2 to 30, carbon atoms, with the ethylenic group —CH=CH— either in a terminal or internal position. Y represents a straight or branched-chain alkylene radical linking the ethylenic group to oxygen in the ester moiety of the arylphosphonate; and $n$ is 0 or 1. When the ethylenic group is in the terminal position in the alkenyl radical, R represents hydrogen. When the alkenyl radical contains only 2 carbon atoms, such as the vinyl group, $n$ is 0 and R is hydrogen.

Representative dialkenyl arylphosphonates are divinyl benzenephosphonate, diallyl benzenephosphonate, di-butenyl naphthalenephosphonate, dihexenyl phenan-threnephosphonate, dioleyl toluenephosphonate, diallyl-2,4,5-trimethyl phenylphosphonate, diheptenyl-4-bromo phenylphosphonate, didodecenyl-3-chloro phenylphos-phonate, divinyl-3-nitro phenylphosphonate, diallyl-3-methyl-2,5,6-trichloro phenylphosphonate, dipentenyl-3, 4-dichloro phenylphosphonate, dihexenyl-2,4,5-trimethyl-6-chloro phenylphosphonate, diallyl-4-phenyl benzene-phosphonate.

The preparation of the novel arylphosphonates of this invention is effected by intermittently mixing the reactants and heating the reaction mixture at a temperature within the range of from about 85 to about 185° C., preferably from about 100 to about 150° C., for a period of time sufficient to effect formation of the phosphonate, which may be from about 2 to about 48 hours, preferably 6 to about 30 hours. The conversion can be carried out in the presence or absence of inorganic solvents.

The following examples illustrate the manner in which these adducts can be produced, which adducts are useful as polymerizable monomers and lubricating oil additives.

*Example 1*

A mixture of 16 ml. (0.1 mole) hexachlorocyclopenta-diene and 23.6 g. (0.1 mole) diallyl benzene phosphonate was heated in a reaction flask at 125–135° C. for 8 hours.

A substantially quantitative yield of a pale-red non-distillable oil, $n_D^{20}$ 1.5718 having the formula

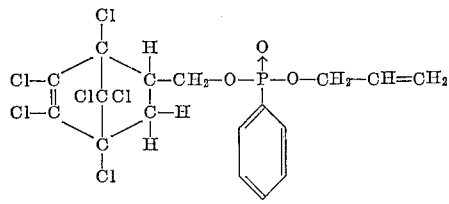

was obtained.

*Analysis.*—Calculated for $C_{17}H_{15}PO_3Cl_6$: Cl 41.6, P 6.07, molecular weight 511. Found: Cl 40.0, P 5.9.

Example 2

A mixture of 32 ml. (0.2 mole) of hexachlorocyclopentadiene and 23.6 g. (0.1 mole) of diallyl benzenephosphonate was heated in a reaction flask at 125–135° C. for 8 hours. A substantially quantitative yield of a red, non-distillable oil, $n_D^{20}$ 1.5591, having the formula

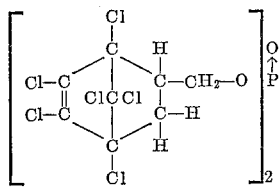

was obtained.

*Analysis.*—Calculated for $C_{22}H_{15}PO_3Cl_{12}$: Cl 54.2, P 3.96. Found: Cl 53.2, P 3.85.

The adduct of this example is especially useful as an additive for lubricating oils.

It has been found that arylphosphonates corresponding to Formula I above are especially useful as a polymerizable monomer for the preparation of fire-retardant polymeric materials, especially those interpolymeric materials obtained by the copolymerization of polymerizable monomeric compounds containing an ethylenic >C=C< group.

Copolymerization can be performed by any method known to the art, especially wherein a catalyst is used that causes polymerization through the ethylenic groups present in the monomeric components. For example, to prepare an ethylene/arylphosphonate copolymer, ethylene may be reacted under pressure in an emulsion process with the arylphosphonate in the presence of a reduction-oxidation (redox) catalyst. The resulting copolymer, in the form of a latex, may be coagulated with a brine solution; the brine is removed by washing with water and alcohol and the copolymer is then dried. Such a process is disclosed more fully in U.S. Patent 2,703,794 to M. J. Roedel, which disclosure to the extent pertinent to the present invention is incorporated by reference. The process involves essentially polymerizing the polymerizable monomers in the presence of a reducing agent and an oxidizing agent, the agents being capable of generating a free radical by a reduction-oxidation reaction.

The polymerizable monomeric compounds suitable for use in preparing the fire-retardant polymeric materials can be any compound containing one or more ethylenic >C=C< groups. Such compounds can be aliphatic hydrocarbons containing internal or terminal ethylenic groups, such as ethylene, propylene, butene, butadiene, pentene, hexene, octene, etc. Another class of polymerizable monomers are the mono- and poly-nuclear aralkenes having one or more ethylenic unsaturated hydrocarbyl groups as well as other unreactive substituents on the aromatic nucleus. Illustrative of such aralkenes are styrene, halo-styrenes and other vinyl aromatic compounds listed in Table 17–33, pages 781 et seq. of "Styrene, Its Polymers, Copolymers and Derivatives" by Boundy and Boyer, published by Reinhold Publishing Corporation (1952); which list is incorporated herein by reference. The preferred aralkenes are the hydrocarbons and nuclear halogen-substituted vinyl aromatic compounds of the benzene series, especially styrene.

Other polymerizable monomers which can be used are acids, such as acrylic and methacrylic; nitriles, such as acrylonitrile and methacrylonitrile; vinyl esters, such as vinyl acetate, vinyl propionate and vinyl stearate; esters of unsaturated dibasic acids, such as dimethyl maleate and dibutyl fumarate; amides, such as acrylamides, methacrylamide, methylolacrylamide, and methylol-methacrylamide; hydroxy compounds such as ethylene glycol monoacrylate or monomethacrylate, glycerol monoacrylate or monomethacrylate or glycerol allyl ether; and vinyl alkyl ethers such as vinyl butyl ether, vinyl ethyl ether, vinyl hexyl ether, etc.

The polymerizable monomeric compound will ordinarily constitute a major proportion of the polymerizable mixture. The preferred ratio of the polymerizable monomer to the arylphosphonate containing hexachloronorbornene nucleus is at least 2 to 1, but may be as high as 50 to 1.

The preferred catalyst for use in polymerizing the arylphosphonate containing the hexachloronorbornene nucleus is the redox combination of potassium persulfate and sodium metabisulfite.

The resulting copolymers or interpolymers may be used directly in the formation of film, fibers and the like by processes well known to those skilled in the art. The polymers can be molded into objects, extruded as tubing, filaments, films, rods, etc. and melt cast or cast from suitable solvents to provide thin films and the like. Solutions of the polymers may be coated on paper, fabrics, or on films of other polymeric materials such as regenerated cellulose films to impart desirable properties to the thus coated base films.

Example 3

This example illustrates the preparation of a copolymer of styrene and an adduct of hexachlorocyclopentadiene and diallyl benzenephosphonate. To a 500 ml., round-bottomed, creased flask equipped with a paddle stirrer were added 10 g. of the styrene and diallyl benzenephosphonate adduct of Example 1, 30 g. of styrene, 0.4 g. of potassium persulfate, 0.2 g. of sodium meta-bisulfite, 0.2 g. of sodium oleate, and 80 g. of distilled water. The mixture was vigorously agitated at 25° C. for 4 hours. The copolymer was coagulated with an aqueous solution of 10% in sodium chloride. The liquid was decanted. The rubbery product was contacted with several portions of ethanol until it became friable. The product was washed several times with ethanol in a Waring blender, filtered, and dried at 90° C. under vacuum. The copolymer which weighed 18.9 g. was 87 percent by weight styrene. The chlorine content was 5.4% and the phosphorous percentage was 0.85%. A pellet formed at 180° C. under 4000 p.s.i.g. pressure was clear, tough and fire retardant.

Thus, having described the invention, what is claimed is:

1. An interpolymer made by the copolymerization of a mixture of polymerizable monomers comprising (A) a phosphonate having the formula

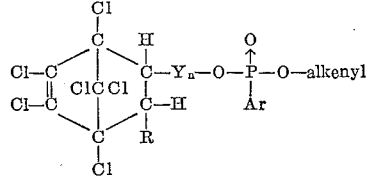

wherein Ar is an aromatic radical of the group consisting of phenyl, naphthyl, phenanthryl and anthryl radicals and such radicals substituted with alkyl, aryl, chloro, bromo and nitro groups, R is from the group consisting of hydrogen and alkyl, Y is a divalent alkylene radical, and $n$ is an integer from 0 to 1, and (B) a polymerizable monomeric compound containing an ethylenic >C=C< group, said interpolymer being formed in the presence of a catalyst that causes polymerization through the ethylenic groups present in the monomeric components.

2. The composition of claim 1 wherein monomer B is an aralkene containing a terminal >C=CH₂ group.

3. A copolymer of (A) an arylphosphonate having the formula

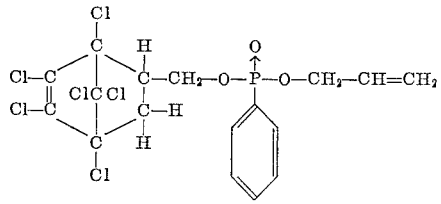

and (B) styrene, said copolymer being formed in the presence of a catalyst that causes polymerization through the ethylenic groups present in the monomeric components.

4. The method of preparing an interpolymer which comprises copolymerizing monomers (A) a phosphonate having the formula

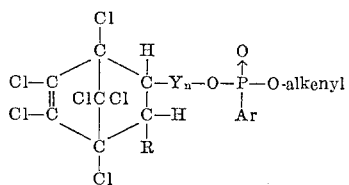

wherein Ar is an aromatic radical of the group consisting of phenyl, naphthyl, phenanthryl and anthryl radicals and such radicals substituted with alkyl, aryl, chloro, bromo and nitro groups, R is from the group consisting of hydrogen and alkyl, Y is a divalent alkylene radical, and $n$ is an integer from 0 to 1, and (B) a polymerizable monomeric compound containing an ethylenic >C=C< group, in the presence of a catalyst that causes polymerization through the ethylenic groups of monomers A and B.

5. The method of claim 4 wherein said catalyst is a redox combination of potassium persulfate and sodium metabisulfite.

6. The method which comprises copolymerizing monomers (A) styrene and (B) an arylphosphonate of the formula

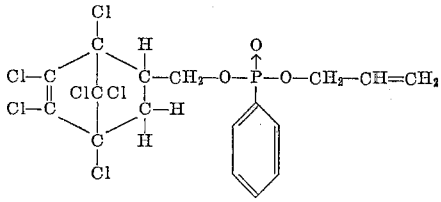

in the presence of a catalyst that causes polymerization through the ethylenic groups of monomers A and B.

7. The method of claim 6 wherein said catalyst is a redox combination of potassium persulfate and sodium metabisulfite.

No references cited.

JOSEPH L. SCHOFER, *Primary Examiner.*